May 5, 1964 L. S. GREENBERG 3,132,057

GRADED ENERGY GAP SEMICONDUCTIVE DEVICE

Filed Jan. 29, 1959

INVENTOR
LEON S. GREENBERG

BY H. Vincent Harsha

ATTORNEY

United States Patent Office 3,132,057

Patented May 5, 1964

3,132,057

GRADED ENERGY GAP SEMICONDUCTIVE DEVICE

Leon S. Greenberg, Natick, Mass., assignor to Raytheon Company, a corporation of Delaware Filed Jan. 29, 1959, Ser. No. 789,863
1 Claim. (Cl. 148—33)

This invention relates generally to semiconductive devices and methods of fabricating them, and more particularly to a novel construction for said devices in which a region of the device is provided with graded energy gap material across the physical width of the region.

Semiconductive devices are now known wherein a chip or body of semiconducting material, which may be germanium or silicon, is provided with significant impurity materials in order to form regions having different electrical conductivity characteristics. The conductivity type of the semiconductive material depends upon whether the impurity material is a "donor" impurity, which, upon replacing an atom in the crystal lattice of the semiconducting material, supplies an excess of electrons or is one of those designated as "acceptor" impurities, which result in a deficiency of electrons in the lattice structure. The former type supplies unbonded electrons which serve as negative mobile charge carriers, while the latter create electron deficiencies or "holes" which serve as positive mobile charge carriers. The donor and acceptor impurities may, for example, be chosen from the third and fifth groups of the Periodic Table according to Mendelyeev, the acceptor impurities from the third group being designated as P-type impurities, while the donor impurities from the fifth group are designated as N-type impurities. When an area of the semiconductor body is provided with a predominance of P-type impurity atoms, the area is said to be a P-type region or zone, and electrical conduction through the region will be primarily by holes. Conversely, when an area of the semiconductor body is provided with a predominance of N-type impurity atoms, the area is said to be an N-type region or zone, and electrical conduction through the region is primarily by electrons. The interface between a P-type region and an N-type region acts as a rectifying barrier, and is known as a P-N (N-P) junction.

One type of such device comprises a body of semiconductive material having a region of one conductivity-type material, such as an N-type region, intermediate regions of opposite conductivity-type material, such as P-type regions, and is designated as a junction transistor. The intermediate N-type region constitutes the base region, while the two outer P-type regions may be termed the emitter and collector regions. The interface between the emitter and base regions constitutes the emitter junction, while the interface between the collector and base regions constitutes the collector junction.

In the past, these semiconductive devices have been fabricated from semiconductive material having a constant energy gap due to the physical structure of the material utilized in manufacturing the devices. In accordance with the principles of the present invention, it has been found that certain unobvious results and accompanying advantages may be obtained in the performance of such devices if they are constructed so as to include material in one of the active regions which presents a graded energy gap across the region rather than the constant energy gap involved in presently known devices. In particular, it has been found that the base region of a transistor, when made of graded energy gap material, provides a unit in which an effective drift field is created in the base region which aids the flow of injected carriers across the base region, results in increased emitter efficiency and lowers the emitter capacitance, thereby resulting in increases in the power handling capabilities or the upper limit of the $\alpha$ cut-off frequency. The use of graded energy gap material in the collector region of a diode also presents corresponding advantages.

The invention will be better understood as the following description proceeds taken in conjunction with the accompanying drawings wherein.

Figure 1:
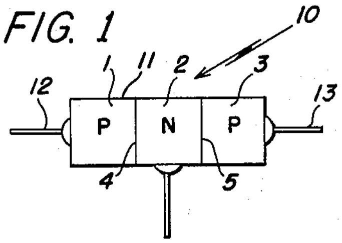
FIG. 1 is a diagrammatic view of a semiconductor device having graded energy gap material across the base region.
Figure 2:
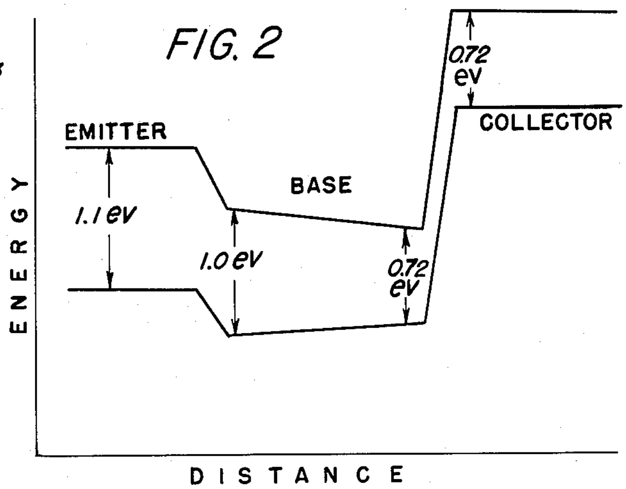
FIG. 2 is an energy band diagram showing the variation of the energy gap across the base region of the device of FIG. 1.

Referring now to the drawings and more particularly to FIG. 1 thereof, there is shown a semiconductive device of the type now known as transistors and including adjacent regions of different electrical conductivity characteristics. In the figure, the region 1 may be termed the emitter region, the region 2 the base region, while the remaining region 3 of the chip is the collector region. A first P-N junction 4 is present at the interface between the emitter and base regions, while a collector junction 5 exists at the interface between the base and collector regions. The device of FIG. 1 is composed of semiconducting material 1, which will provide a graded energy gap from one end of the transistor structure to the other along the length of the device 10. In one form of the present invention, this structure may be achieved by melting a mixture of fifty percent silicon powder by weight with fifty percent germanium powder by weight in a suitable furnace constructed in accordance with principles well-known in the art. A crystal may then be conventionally grown from the melt by lowering a seed in contact with the melt and slowly withdrawing the seed to cause a crystal to grow on the seed as the melt solidifies during the pulling process. Due to the segregation coefficients of germanium and silicon, the first part of the crystal to grow will be substantially pure silicon with only a small portion of germanium therein, and this relative proportion will vary along the length of the crystal until in the last portion of the crystal grown, the ratio will be reversed, i.e., the last part of the crystal will be substantially pure germanium with only a relatively small percentage of silicon present. Intermediate the two ends of the crystal the material will vary in the percentage of germanium and silicon at any point and will thus, in effect, be composed of a series of different alloys. The crystal may be doped with an N-type impurity material either during the growth of the crystal or by introducing the N-type material into the crystal after it is grown. The crystal may then be conventionally lapped, etched and sliced to produce a large number of N-type slices. A P-type impurity may then be introduced into the slices to create the P-type regions 1 and 3 between which will be the N-type base region 2. Thus, the main body of the chip 1 will be composed of an alloy of germanium and silicon, which will vary in the percentage of each constituent element along the length of the chip from a ratio of approximately eighty percent silicon to twenty percent germanium in the region 1 to a percentage of approximately twenty percent silicon to eighty percent germanium in the region 3. Due to the continuous variation in the percentage of germanium and silicon across the base region 2, a graded energy gap material is provided in which the energy gap varies substantially in accordance with the energy diagram shown in FIG. 2. Thus, the energy gap of material at the emitter junction 4 will be essentially one electron volt and this gap will continuously decrease until at the collector junction 5 the energy gap will be substantially .72 electron volt. Conducting leads 12, 13 and 14 may then be attached to the emitter, collector and base regions, respectively, in order to complete the unit. As previously described, the graded energy gap having the widest part at the emitter junction and the narrowest part at the collector junction will set up an aiding drift field in the transistor, which will be in a direction to accelerate the minority carriers injected by the emitter junction as they travel across the base region to the collector junction 5. Since more holes in the emitter region are now available as current carriers for the same emitter doping level, and also for the same values of emitter bias voltages as are used with presently known devices, the emitter efficiency of the device of FIG. 1 will be improved over that of these known devices.

Figure 3:
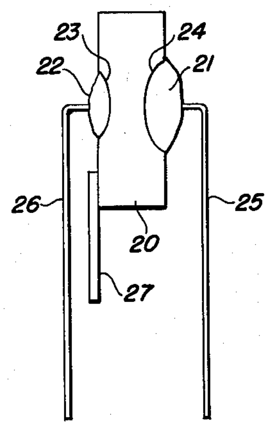
FIG. 3 is another embodiment of a device in accordance with the present invention.

In FIG. 3 there is shown a further embodiment of the present invention in which the transistor structure is formed by alloying impurity dot material into opposing sides of a semiconductive chip composed of graded energy gap material. As in the embodiment shown in FIG. 1, the chip 20 may be composed of an N-type alloy of germanium and silicon in which the percentage of the two elements varies continuously across the width of the chip. P-type impurity dots 21 and 22 may then be alloyed into opposite faces of chip 20 to form emitter and collector regions. The dot 21 may be composed of silicon and gallium, for example, while the impurity dot 22 may be a composition of indium and germanium. The base region between the emitter junction 23 and the collector junction 24 is, therefore, composed of a varying composition of silicon and germanium in which the greatest concentration of silicon is in the vicinity of the junction 23, while the greatest concentration of germanium is in the vicinity of the junction 24. The active base region between these two junctions comprises graded energy gap material, which has the characteristics previously described. Conducting leads 25, 26 and base tab 27 may then be attached to the device in any suitable manner, as by soldering, in order to complete the unit.

Figure 4:
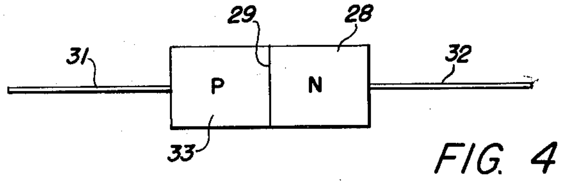
FIG. 4 is a diagrammatic view of a diode made in accordance with the principles of the present invention.

FIG. 4 shows a semiconductor diode, which may be fabricated in accordance with the principles of the present invention. In the figure, the collector region 28 of the diode to the right of P-N junction 29 is made to have a graded energy gap by constructing the collector region from a composition of varying percentages of silicon and germanium. Conducting leads 31 and 32 may then be attached to P-type region 33 and N-type region 28 to complete the unit. The advantages attained by the diode structure shown are primarily that the forward resistance of the diode is made lower with consequent lower forward voltage drops. In addition, the diode may be used in switching circuits in which faster switching speeds may be realized without resorting to high doping of the collector region, which results in a degradation of the $I_{co}$.

Figure 5:
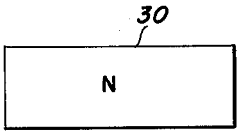
FIGS. 5 through 7 show various stages of manufacture of another device in accordance with the present invention.
Figure 6:
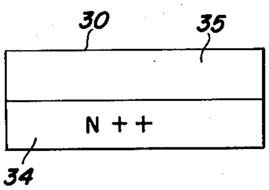
Figure 8:
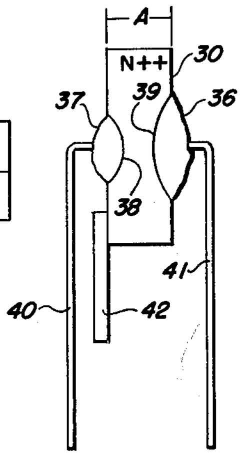
FIG. 8 shows the completed device of FIGS. 5 through 7.
Figure 7:
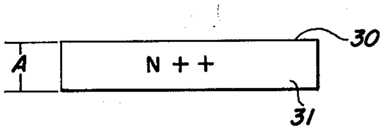

In FIGS. 5 through 7, there is shown a still further embodiment of the present invention in which the semiconductive device is fabricated from a chip of an intermetallic compound composed, for example, of elements from groups III and V of the periodic table. The figures show the chip 30 during various steps of preparation. Referring to FIG. 5, the chip 30 may be composed of an intermetallic compound, such as indium antimonide, in which there is a slight excess of the antimony in order to make the chip originally N-type. A further impurity material, for example, phosphorus, may then be introduced into the chip 30 to a suitable depth to form the region 34, which is indicated in FIG. 6 as being more strongly N-type than the adjacent region 35 due to the inclusion of the phosphorus. The phosphorus may be introduced by any process well-known in the art, as, for example, by diffusing phosphorus into the chip 30 from the vapor phase. After the formation of the region 34, the region 35 may be removed in any suitable manner, as by lapping and etching, in order to provide the structure shown in FIG. 7 in which only the strongly N-type region 34 remains. Due to the inclusion of the phosphorus, the chip 30 may be considered as composed of a series of separate intermetallic compounds across the width A of the chip 30. Each compound exhibits an energy gap which is different from its neighbor and, therefore, the chip 30 comprises material in which the energy gap continuously varies across its width. After the chip 30 has been so prepared, impurity dots 36 and 37 may be alloyed into opposing sides in order to provide emitter and collector junctions 38 and 39, as shown in FIG. 8. The dots 36 and 37 may be, for example, an alloy of antimony and indium in which the indium is in excess so that the dots 36 and 37 are P-type. An emitter lead 40 may then be attached to the emitter dot 37 in any suitable manner, and a collector lead 41 may similarly be attached to the collector dot 36. To complete the unit, base tab 42 is ohmically connected to the chip 30.

Although there has been described what are considered to be preferred embodiments of the present invention, various adaptations and modifications thereof may be made without departing from the spirit and scope of the invention as defined in the appended claim.

What is claimed is:

A semiconductive device comprising a body of semiconductive material having an emitter region and a collector region, said collector region being composed of a material exhibiting a graded energy gap across said collector region.

References Cited in the file of this patent

UNITED STATES PATENTS

| | | |
|---|---|---|
| 2,843,511 | Pankove | July 15, 1958 |
| 2,843,515 | Statz et al. | July 15, 1958 |
| 2,843,516 | Herlet | July 15, 1958 |
| 2,846,340 | Jenny | Aug. 5, 1958 |
| 2,847,335 | Gremmelmaier et al. | Aug. 12, 1958 |
| 2,855,334 | Lehovec | Oct. 7, 1958 |
| 2,878,152 | Runyon et al. | Mar. 17, 1959 |
| 2,890,142 | Kroger et al. | June 9, 1959 |
| 2,929,859 | Loferski | Mar. 22, 1960 |
| 2,944,975 | Folberth | July 12, 1960 |
| 2,961,475 | Sommers | Nov. 22, 1960 |
| 3,111,611 | Hunter | Nov. 19, 1963 |

FOREIGN PATENTS

| | | |
|---|---|---|
| 805,493 | Great Britain | Dec. 10, 1958 |

OTHER REFERENCES

Zeitschrift für Anorganische und Allgemeine Chemie, vol. 241, No. 4, pages 305 to 323, relied on pages 314 to 316.

Physical Review, vol. 99, No. 6, September 15, 1955. Pages 1810–1814. Article by Levitas.

Physical Review, vol. 97, No. 6, March 15, 1955. Pages 1575–1578. Article by Detwiller.